(12) United States Patent
Ichige

(10) Patent No.: US 10,218,960 B2
(45) Date of Patent: Feb. 26, 2019

(54) STEREOSCOPIC IMAGING APPARATUS

(71) Applicant: Hitachi Automotive Systems, Ltd., Hitachinaka-shi, Ibaraki (JP)

(72) Inventor: Atsushi Ichige, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 314 days.

(21) Appl. No.: 14/347,899

(22) PCT Filed: Oct. 1, 2012

(86) PCT No.: PCT/JP2012/075297
§ 371 (c)(1),
(2) Date: Mar. 27, 2014

(87) PCT Pub. No.: WO2013/058085
PCT Pub. Date: Apr. 25, 2013

(65) Prior Publication Data
US 2014/0232830 A1    Aug. 21, 2014

(30) Foreign Application Priority Data

Oct. 18, 2011    (JP) ................. 2011-228432

(51) Int. Cl.
*H04N 13/239*    (2018.01)
*H04N 13/128*    (2018.01)
(Continued)

(52) U.S. Cl.
CPC ....... *H04N 13/239* (2018.05); *H04N 13/0011* (2013.01); *H04N 13/0025* (2013.01);
(Continued)

(58) Field of Classification Search
CPC ............... G03B 35/08; H04N 13/0011; H04N 13/0022; H04N 13/0025; H04N 13/0239; H04N 2013/0081; H04N 2013/0088
(Continued)

(56) References Cited

U.S. PATENT DOCUMENTS

| 6,987,534 B1 * | 1/2006 | Seta ................. G01S 11/12 348/229.1 |
| 7,495,699 B2 * | 2/2009 | Nayar ............. H04N 5/2351 348/222.1 |

(Continued)

FOREIGN PATENT DOCUMENTS

| JP | 11-252585 A | 9/1999 |
| JP | 11355624 | 12/1999 |

(Continued)

OTHER PUBLICATIONS

PCT International Search Report, PCT/JP2012/075297, dated Jan. 15, 2013 (5 pages).

*Primary Examiner* — Christopher S Kelley
*Assistant Examiner* — Kathleen M Walsh
(74) *Attorney, Agent, or Firm* — Foley & Lardner LLP

(57) ABSTRACT

In order to provide a stereoscopic imaging apparatus that can acquire, in a case in which a brightness different is large, parallax information containing a parallax image in all image capturing frames, provided are an image acquisition unit that acquires a first image and a second image different from the first image in exposure time, a gain and offset correction unit 102 that corrects brightness of one of the acquired first and second images, a parallax calculation unit 103 that calculates parallax from one of the images corrected by the brightness correction unit and the other of the images and outputs a parallax image and parallax information, and a combination image generation unit 105 that combines the (Continued)

acquired first and second images together to generate a combination image and outputs the generated combination image.

12 Claims, 3 Drawing Sheets

(51) Int. Cl.
    *H04N 13/00*            (2018.01)
    *G03B 35/08*            (2006.01)

(52) U.S. Cl.
    CPC ........... *H04N 13/128* (2018.05); *G03B 35/08* (2013.01); *H04N 2013/0081* (2013.01); *H04N 2013/0088* (2013.01)

(58) Field of Classification Search
    USPC .................................................. 348/42, 47
    See application file for complete search history.

(56) References Cited

U.S. PATENT DOCUMENTS

| | | | | |
|---|---|---|---|---|
| 7,599,521 | B2* | 10/2009 | Watanabe | G06K 9/00805 348/149 |
| 8,031,225 | B2* | 10/2011 | Watanabe | B60R 1/00 348/143 |
| 8,072,503 | B2* | 12/2011 | Tischer | H04N 5/235 348/159 |
| 8,345,144 | B1* | 1/2013 | Georgiev | G03B 11/00 348/335 |
| 8,488,041 | B2* | 7/2013 | Nakajima | H04N 5/228 348/222.1 |
| 8,493,436 | B2* | 7/2013 | Lyon | H04N 5/23238 348/47 |
| 8,704,881 | B2* | 4/2014 | Imada | H04N 13/0011 348/46 |
| 8,885,025 | B2* | 11/2014 | Iwabuchi | H04N 13/026 348/43 |
| 2003/0085991 | A1* | 5/2003 | Toda | H04N 13/0239 348/42 |
| 2005/0275747 | A1* | 12/2005 | Nayar | H04N 5/2355 348/362 |
| 2006/0140510 | A1* | 6/2006 | Wallace | G06K 9/00362 382/294 |
| 2006/0268159 | A1 | 11/2006 | Orimoto et al. | |
| 2007/0229698 | A1* | 10/2007 | Kakinuma | H04N 5/144 348/362 |
| 2008/0055683 | A1* | 3/2008 | Choe | H04N 1/387 358/525 |
| 2008/0181461 | A1* | 7/2008 | Saito | G06K 9/00825 382/104 |
| 2008/0205705 | A1* | 8/2008 | Kashimura | B60Q 1/1423 382/104 |
| 2010/0134652 | A1* | 6/2010 | Takane | H04N 5/2258 348/229.1 |
| 2010/0194902 | A1* | 8/2010 | Lin | H04N 5/235 348/222.1 |
| 2010/0295962 | A1* | 11/2010 | Terauchi | H04N 5/23219 348/222.1 |
| 2011/0012998 | A1* | 1/2011 | Pan | H04N 5/23212 348/47 |
| 2011/0019989 | A1* | 1/2011 | Tanaka | H04N 5/23212 396/104 |
| 2011/0069205 | A1* | 3/2011 | Kasai | G06T 7/2053 348/239 |
| 2011/0109727 | A1* | 5/2011 | Matsuura | H04N 5/23212 348/47 |
| 2011/0122308 | A1* | 5/2011 | Duparre | H01L 27/14621 348/340 |
| 2011/0176024 | A1* | 7/2011 | Kwon | H04N 5/23232 348/222.1 |
| 2011/0234765 | A1* | 9/2011 | Tanaka | H04N 13/0018 348/47 |
| 2011/0234801 | A1* | 9/2011 | Yamada | B60R 1/00 348/148 |
| 2011/0273531 | A1* | 11/2011 | Ito | H04N 13/026 348/43 |
| 2011/0304746 | A1* | 12/2011 | Iijima | G03B 7/097 348/229.1 |
| 2012/0062694 | A1* | 3/2012 | Muramatsu | G01C 3/08 348/36 |
| 2012/0105672 | A1* | 5/2012 | Doepke | H04N 5/2353 348/229.1 |
| 2012/0162366 | A1* | 6/2012 | Ninan | H04N 5/2355 348/43 |
| 2013/0124471 | A1* | 5/2013 | Chen | H04N 5/23238 707/624 |

FOREIGN PATENT DOCUMENTS

| | | | |
|---|---|---|---|
| JP | 2000-56414 A | | 2/2000 |
| JP | 2003-18617 A | | 1/2003 |
| JP | 2003018617 A | * | 1/2003 |
| JP | 2005223605 A | * | 8/2005 |
| JP | 2006-5621 A | | 1/2006 |
| JP | 2009234344 A | * | 10/2009 |
| JP | 2010103810 A | * | 5/2010 |
| JP | 2010-147786 A | | 7/2010 |
| JP | 2010-230879 A | | 10/2010 |

* cited by examiner

STEREOSCOPIC IMAGING APPARATUS

TECHNICAL FIELD

The present invention relates to a stereoscopic imaging apparatus having a plurality of imaging devices.

BACKGROUND ART

In recent years, obstacle detection apparatuses that detect obstacles such as pedestrians and vehicles using a plurality of cameras such as stereoscopic cameras have been put to practical use. The stereoscopic camera is an apparatus that calculates the positional deviation (parallax) of the same object on a plurality of images captured at the same time by template matching and calculates the position of the object in real space based on the calculated parallax according to a known conversion equation.

The stereoscopic camera is such that a distance to an object is calculated to recognize the object using a pair of images captured by two left and right imaging devices.

In disclosed PLT 1, it is possible to perform, using the stereoscopic camera, stereoscopic imaging that records an image in a scene with a large brightness difference and solves a problem in which an observer partially cannot perceive a brightness difference due to blown out highlights or blocked up shadows at the reproduction of the image.

In addition, PLT 2 discloses, instead of the stereoscopic camera, an imaging apparatus that can acquire a wide dynamic range three-dimensional image and high-accuracy distance information.

CITATION LIST

Patent Literatures

PTL 1: JP 2000-56414 A
PTL 2: JP 2003-18617 A

SUMMARY OF INVENTION

Technical Problem

When a high brightness part is exposed by an imaging device of a general dynamic range (e.g., around 60 dB) in a case in which a brightness difference is large, for example, in a case in which a road surface and the brake lamp of a leading vehicle are captured at the same time in the night or in a case in which areas inside and outside a tunnel are captured at the same time at the entrance of the tunnel, other parts are darkened (hereinafter referred to as blocked up shadows). Conversely, when a low brightness part is exposed, the high brightness part is saturated to be white (hereinafter referred to as blown out highlights).

In addressing such a problem, the related art like PLT 1 can capture images in such a manner that the exposure times of left and right cameras capable of performing stereoscopic imaging are made different. In this case, however, the left and right images are only combined together and output such that their brightness looks equal to a greatest extent. Therefore, parallax information containing a parallax image cannot be acquired.

Moreover, in order to acquire parallax information containing a parallax image in a stereoscopic imaging apparatus, two images are required to have the same brightness. The related art like Patent Literature 2 can combine a long exposure image and a short exposure image together to generate a wide dynamic range image for each image capturing frame. In this case, however, at least two or more frames are required to acquire the long exposure image and the short exposure image. When an image capturing time is different at high-speed running, an acquired image, i.e., an image capturing scene is largely changed. Therefore, it is difficult to accurately acquire parallax information containing a parallax image.

An object of the invention is to provide a stereoscopic imaging apparatus that can acquire, in a case in which a brightness difference is large, parallax information containing a parallax image in all image capturing frames.

Solution to Problem

In order to solve the above-described problems, a stereoscopic imaging apparatus of the present invention includes: an image acquisition unit that acquires a first image and a second image different from the first image in exposure time; a brightness correction unit that corrects brightness of one of the acquired first and second images; a parallax calculation unit that calculates parallax from one of the images corrected by the brightness correction unit and the other of the images and outputs a parallax image and parallax information; and a combination image generation unit that combines the acquired first and second images together to generate a combination image and outputs the generated combination image.

Advantageous Effects of Invention

According to the present invention, it is possible to provide a stereoscopic imaging apparatus that can acquire, in a case in which a brightness difference is large, parallax information containing a parallax image in all image capturing frames.

DESCRIPTION OF EMBODIMENTS

Hereinafter, a description will be given on embodiments using the drawings.

First Embodiment

Figure 1:
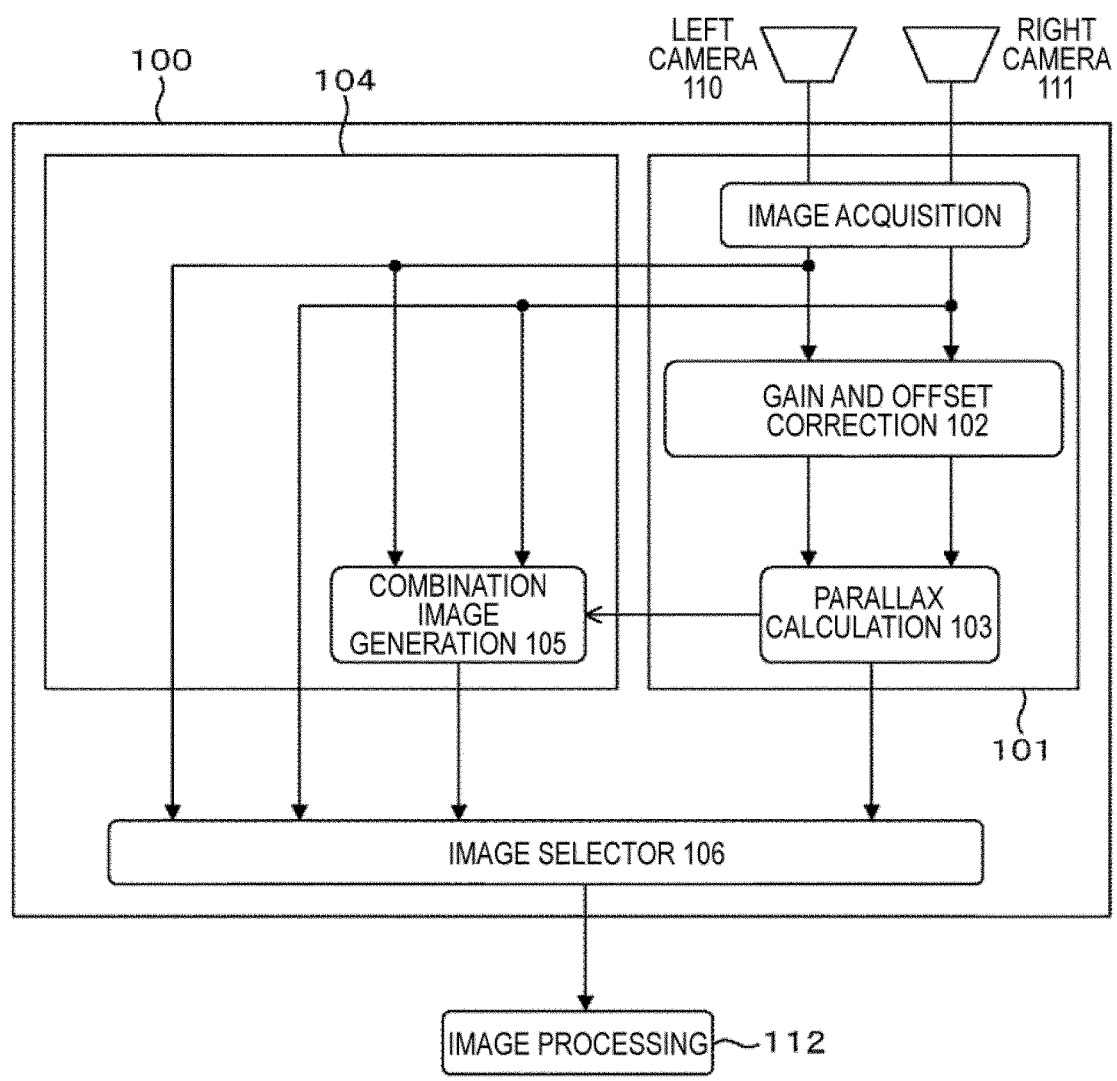
FIG. 1 is a diagram showing an embodiment of a stereoscopic imaging apparatus according to the present invention.
Figure 2:
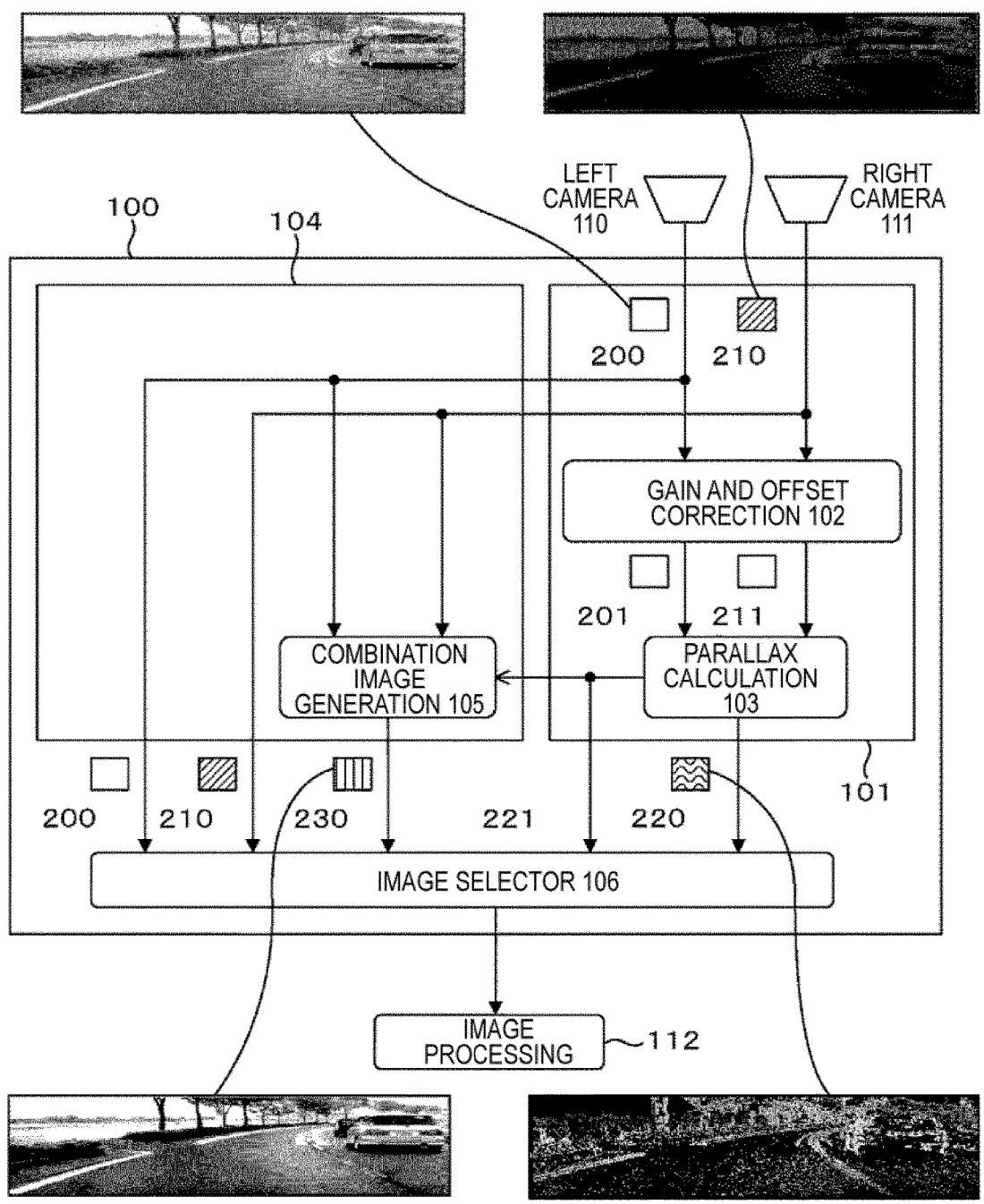
FIG. 2 is a diagram showing examples of images in respective processes shown in FIG. 1.

This embodiment will describe a stereoscopic imaging apparatus 100 using FIGS. 1 and 2.

Examples of an apparatus having imaging devices for acquiring two images include, for example, a camera module. Hereinbelow, a left camera 110 (first imaging device) and a right camera 111 (second imaging device) will be mentioned.

Each of the left camera 110 and the right camera 111 can capture an image with a different exposure time. Accordingly, as images acquired when being captured at the same time (referred to as same frame images), the left camera 110 and the right camera 111 can capture a bright image 200 (first image) and a dark image 210 (second image darker than the first image), respectively. The left and right cameras may constantly capture images with different exposure times depending on imaging conditions and imaging objects or may capture images with the same exposure time as occasion demands. Hereinbelow, for the purpose of describing the present invention, it will be assumed that the left camera 110 captures an image with a long exposure time (first exposure time) for acquiring a bright image and that the right camera 111 captures an image with a short exposure time (second exposure time shorter than the first exposure time) for acquiring a dark image.

An image acquisition unit acquires the bright image 200 and the dark image 210 captured by the left camera 110 and the right camera 111, respectively, and inputs the acquired bright and dark images of the bright image 200 and the dark image 210 to a parallax calculation unit 101 and an image combination unit 104. In the parallax calculation unit 101, the bright and dark images are input to a gain and offset correction unit 102 serving as a brightness correction unit that can correct the brightness of images. The gain and offset correction unit 102 causes the brightness of the bright image 200 and the dark image 210 to match each other. Since the gain and offset correction unit 102 stores the exposure times of the left camera 110 and the right camera 111 in advance, it performs a correction to cause the brightness of the left and right bright and dark images to match each other with a gain value and an offset correction value calculated from the exposure times. Using the left image 201 and the right image 211 in which the brightness difference has been adjusted, the parallax calculation unit 103 calculates a stereoscopic parallax image 220 and parallax information 221.

On the other hand, based on the left and right bright and dark images input to the image combination unit 104, a combination image generation unit 105 causes "blown out highlights" and "blocked up shadows" to complement each other to generate a wide dynamic range image 230. Here, in order to cause the "blown out highlights" and the "blocked up shadows" of the images to complement each other, the combination image generation unit 105 may also select image regions suitable for generating a combination image from the bright image captured by the left camera 110 and the dark image captured by the right camera 111 using the parallax information 221 calculated by the parallax calculation unit 103 as information used to generate the combination image.

With the configuration described above, the bright image 200 from the left camera 110, the dark image 210 from the right camera 111, the stereoscopic parallax image 220, and the wide dynamic range image 230 can be generated.

Here, an image selector unit 106 selects and outputs any of the bright image 200 (first image) from the left camera 110, the dark image 210 (second image) from the right camera 111, the stereoscopic parallax image 220 (parallax image), and the wide dynamic range image 230 (combination image).

For example, the image selector unit 106 selects any of the images described above as an image suitable for an image processing application, whereby a subsequent image processing unit 112 can perform image processing.

As described above, according to the stereoscopic imaging apparatus of the present invention, a wide dynamic range image having performance higher than the dynamic range performance of an imaging device can be generated by the combination of images captured from one frame, and parallax information containing a parallax image as in the related art can be acquired. Therefore, multi-function image processing can be realized by one stereoscopic imaging apparatus.

Second Embodiment

This embodiment will describe an example of a stereoscopic imaging apparatus capable of performing image determination and image selection unlike the first embodiment.

Figure 3:
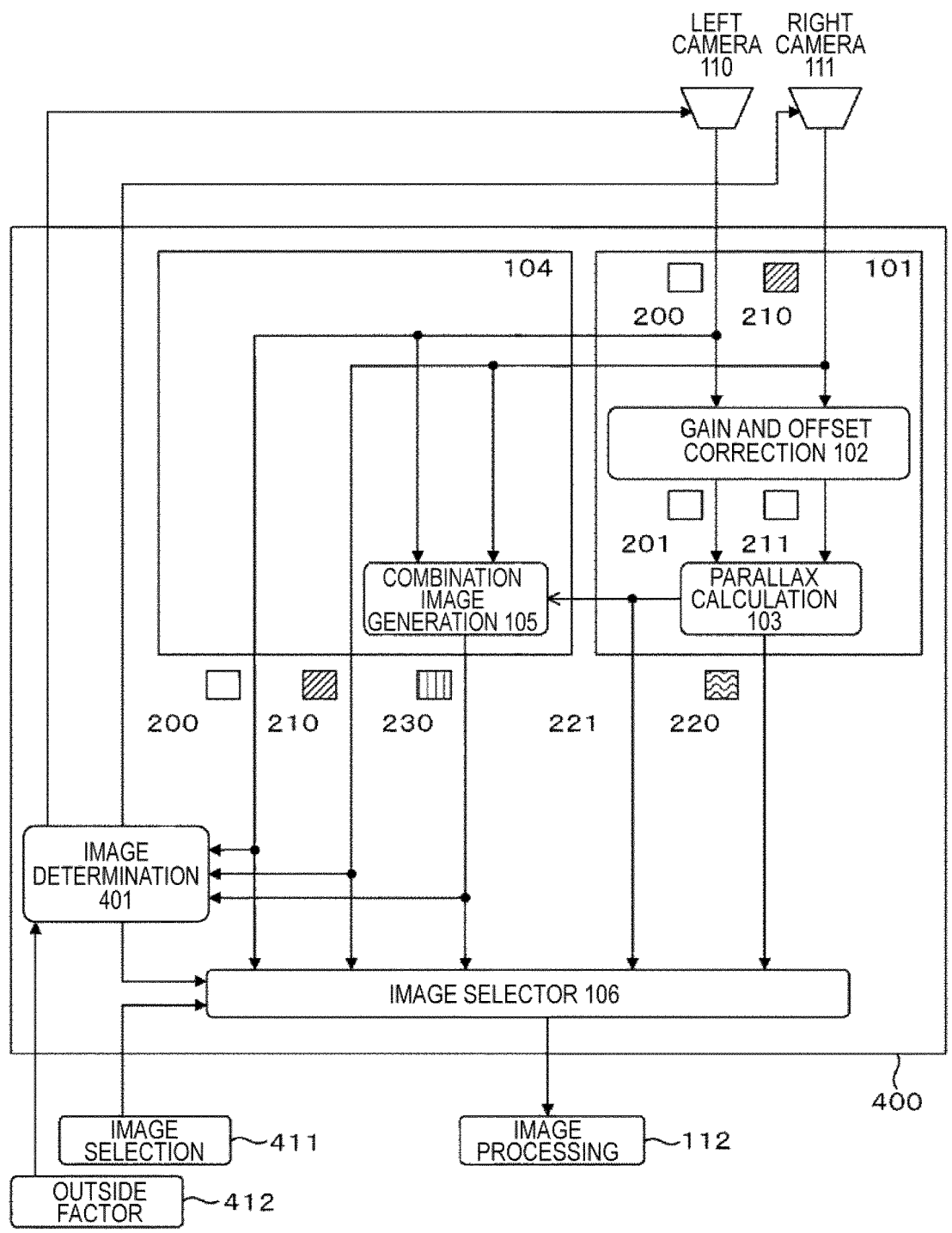
FIG. 3 is a diagram showing another embodiment of a stereoscopic imaging apparatus according to the present invention.

FIG. 3 is an example of a configuration diagram showing a stereoscopic imaging apparatus 400 according to the second embodiment.

The descriptions of units having configurations denoted by the same symbols as those shown in FIG. 1 described above and units having the same functions of the stereoscopic imaging apparatus 100 shown in FIG. 1 will be omitted.

The stereoscopic imaging apparatus 400 shown in FIG. 3 is one in which an image determination unit 401 is provided in the stereoscopic imaging apparatus 100 shown in FIG. 1. A result of the image determination unit 401 is connected to a left camera 110, a right camera 111, and an image selector unit 106. In addition, an outside image selection unit 411 is connected to the image selector unit 106.

Like the stereoscopic imaging apparatus 100, the image determination unit 401 determines an image required in an image processing unit 112 based on a bright image 200 (first image), a dark image 210 (second image darker than the first image), and a wide dynamic range image 230. The image selector unit 106 selects the image based on information from the image determination unit 401.

Besides selecting the image according to a command from the image determination unit 401, the image selector unit 106 can also select the image according to an image selection command from the outside image selection unit 411.

In addition, the image determination unit 401 can also determine exposure times depending on imaging conditions and directly control the exposure times of the left camera 110 and the right camera 111. That is, the exposure times of the imaging devices are determined, and the determined exposure times are output to the imaging devices. Thus, besides the function of adjusting the left and right exposure times, the exposure times are adjusted for each frame such that a bright image and a dark image can be captured for each frame. Moreover, for example, a night-time image capturing scene (entirely dark image) is recognized based on an outside factor 412 (outside factor information) such as side lamp lighting information such that the exposure times to obtain a bright image and a dark image can also be controlled.

In the manner described above, with the control of the exposure times of the left camera 110 and the right camera 111, a bright image and a dark image can be acquired in the same frame and can be separately acquired between different frames.

As described above, according to the present invention, an image most suitable for an image processing application can be selected from images acquired by the stereoscopic imaging apparatus, and multi-functions can be, for example, realized by the one stereoscopic imaging apparatus.

The exposure times of the left camera 110 and the right camera 111 in the same frame and different frames can be each controlled as occasion demands. On the other hand, it is also possible to constantly fix the exposure times. In this case, functions equivalent to conventional functions can also be realized.

Third Embodiment

This embodiment will describe an example of a stereoscopic imaging apparatus having two or more imaging devices.

For example, with the provision of third and fourth cameras (third and fourth imaging devices) besides the left camera 110 and the right camera 111 in the configurations described in the stereoscopic imaging apparatus 100 shown in FIG. 1 and the stereoscopic imaging apparatus 400 shown in FIG. 3, it is also possible to generate various images in the same manner described above. Moreover, for example, the third embodiment can also be applied to a case in which a plurality of monocular cameras is combined together.

REFERENCE SIGNS LIST 100, 400 stereoscopic imaging apparatus
102 gain and offset correction unit
103 parallax calculation unit
105 combination image generation unit
106 image selector unit
110 left camera
111 right camera
112 image processing unit
200 bright image
210 dark image
220 parallax image
221 parallax information
230 wide dynamic range image
401 image determination unit
411 image selection unit
412 outside factor

The invention claimed is:

1. A stereoscopic imaging apparatus, comprising:
an image acquisition unit configured to acquire a first image and a second image different from the first image in exposure time;
a brightness correction unit configured to correct brightness of one of the acquired first and second images;
a parallax calculation unit configured to calculate parallax from one of the images corrected by the brightness correction unit and the other images and to output a parallax image and parallax information;
a combination image generation unit configured to combine the acquired first and second images together to generate a wide dynamic range image based on selected image regions of the first image and second image and the parallax information, and to output the generated wide dynamic range image;
an image selector unit configured to select any of the first image, the second image different from the first image in exposure time, the parallax image, and the wide dynamic range image and to output the selected image to an image processor; and
an image determination unit configured to receive the first image, the second image different from the first image in exposure time, and the wide dynamic range image and to select one of the received images based on requirements of an imaging process to be performed by the image processor and to output the selection of one of the first image, the second image different from the first image in exposure time, and the wide dynamic range image to the image selector unit, wherein
the image determination unit is configured to determine exposure times of imaging devices such that a bright image and a dark image can be captured, based on outside factor information input from an outside factor unit, and to output the determined exposure times to the imaging devices.

2. The stereoscopic imaging apparatus according to claim 1, wherein
the image determination unit is configured to determine the exposure times of the imaging devices for each frame.

3. The stereoscopic imaging apparatus according to claim 1, further comprising
an outside image selection unit configured to issue an image selection command to the image selector unit, wherein
the image selector unit is configured to select an image based on the selection of the image determination unit and the image selection command.

4. The stereoscopic imaging apparatus according to claim 3, wherein
the outside factor information is vehicle lamp lighting information.

5. The stereoscopic imaging apparatus according to claim 3, wherein
the outside factor information is information related to whether it is night-time.

6. A method for stereoscopic imaging, comprising:
acquiring, by an image acquisition unit, a first image and a second image different from the first image in exposure time;
correcting, by a brightness correction unit, a brightness of one of the acquired first and second images;
calculating, by a parallax calculation unit, parallax from one of the images corrected by the brightness correction unit and the other images;
outputting, by the parallax calculation unit, a parallax image and parallax information;
combining, by a combination image generation unit, the acquired first and second images together to generate a wide dynamic range image based on selected image regions of the first image and second image and the parallax information, and outputting the generated wide dynamic range image;
selecting, by an image selector unit, any of the first image, the second image different from the first image in exposure time, the parallax image, and the wide dynamic range image and outputting the selected image to an image processor;
selecting, by an image determination unit to which the first image, the second image different from the first image in exposure time, and the wide dynamic range image are input, one of the input images based on requirements of an imaging process to be performed by the image processor and outputting the selected one of the first image, the second image different from the first image in exposure time, the parallax image, and the wide dynamic range to the image selector unit; and
determining, by the image determination unit, exposure times of imaging devices such that a bright image and a dark image can be captured, based on outside factor information input from an outside factor unit, and outputting the determined exposure times to the imaging devices.

7. The method for stereoscopic imaging according to claim 6, wherein
   the image determination unit determines the exposure times of the imaging devices for each frame.

8. The method for stereoscopic imaging according to claim 6, further comprising
   issuing, by an outside image selection unit, an image selection command to the image selector unit, wherein
   the image selector unit selects an image based on the selection of the image determination unit and the image selection command.

9. The method for stereoscopic imaging according to claim 6, wherein
   the outside factor information is vehicle lamp lighting information.

10. The method for stereoscopic imaging according to claim 6, wherein
    the outside factor information is information related to whether it is night-time.

11. The stereoscopic imaging apparatus according to claim 1, wherein the combination image generation unit is further configured to select the image regions of the first image and the second image based on the parallax information.

12. The method for stereoscopic imaging according to claim 6, further comprising selecting, by the combination image generation unit, the image regions of the first image and the second image based on the parallax information.

* * * * *